United States Patent [19]

Clarke et al.

[11] Patent Number: 4,824,896

[45] Date of Patent: Apr. 25, 1989

[54] PHENOL FORMALDEHYDE ADHESIVE FOR BONDING WOOD PIECES OF HIGH MOISTURE CONTENT AND COMPOSITE BOARD AND VENEERS BONDED WITH SUCH ADHESIVE

[76] Inventors: Michael R. Clarke, 324 Stevens Drive, West Vancouver, B.C., Canada, V7S 1C6; Paul R. Steiner, 1330 Frederick Road, North Vancouver, B.C., Canada, V7K 1J4; Axel W. Anderson, 5774 Elsom Avenue, Burnaby, B.C., Canada, V5H 2Z9

[21] Appl. No.: 165,929

[22] Filed: Mar. 9, 1988

[51] Int. Cl.[4] .......................... C08L 61/00; C08K 3/38
[52] U.S. Cl. .................................... 524/405; 524/541; 525/501
[58] Field of Search ................. 524/405, 541; 525/501

[56] References Cited

U.S. PATENT DOCUMENTS

| | | | |
|---|---|---|---|
| 2,283,740 | 5/1942 | Klemm | 524/541 |
| 2,351,716 | 6/1944 | Smith | 525/501 |
| 2,620,288 | 12/1952 | Schrader et al. | 525/501 |
| 4,458,049 | 7/1984 | Diem et al. | 524/541 |

*Primary Examiner*—Lewis T. Jacobs

[57] ABSTRACT

Disclosed is an improved phenol formaldehyde (PF) resin that does not require fillers or extenders and is capable of bonding wafers or veneers having a moisture content of 10% or above. In the case of veneers exceptional results are obtained when the permeability of the veneer is increased by incising.

The adhesive composition is prepared by mixing together a caustic solution of a high molecular weight PF resin, a dispersion of PF resin which is characterized in that it can swell in aqueous caustic medium but not go into solution, and a chemical which is capable of reacting with resins in both the continuous and the disperse phase, such as alkylene carbonates or phenol resorcinol formaldehyde (PRF) resins. Optionally, a component may be used such as borax which is capable of complexing with resins in the continuous and the disperse phase. The disperse phase is made by converting a solution of a PF resin into a fine particle size particulate form by precipitation, spray drying or freeze drying and partially cross-linking the resin during or subsequent to the formation of the fine particle size dispersion. The PF resin is partially cross-linked by (a) heat, by (b) acid catalysis, or by (c) a reaction with cross-linking chemicals such as cyclic carbonates or epoxy compounds or by a combination of (a) (b) and (c).

The disperse phase may be made from a PF resin or from a resin in which some of the phenol has been replaced by other phenolic chemicals such as resorcinol, catechol, or kraft lignin. The chemical capable of reacting with resins in the continuous and the disperse phase may be a cyclic carbonate or a phenol resorcinol resin.

Also disclosed is a wood product produced from veneers having moisture contents at 10% or above and incised to improve their permeability to gases and liquids.

14 Claims, 3 Drawing Sheets

PHENOL FORMALDEHYDE ADHESIVE FOR BONDING WOOD PIECES OF HIGH MOISTURE CONTENT AND COMPOSITE BOARD AND VENEERS BONDED WITH SUCH ADHESIVE

FIELD OF INVENTION

This invention relates to improvements in hot press wood composites such as waferboard, plywood and the like and particularly to a phenol formaldehyde (PF) resin comprising three components which together control resin migration in high moisture conditions.

BACKGROUND OF INVENTION

Recent years have seen major innovations in plywood manufacturing to increase productivity and decrease costs. One result of these innovations has been a shift of the process bottleneck to the drying operation. The need to increase drying throughput and the opportunity to improve product quality by reducing de-grade due to over-drying, has stimulated the development of adhesives tolerant to high veneer moisture. The results of research in this direction have not yet shown up in the U.S. patent literature, with the exception of U.S. Pat. No. 2,620,288.

The use of phenolic adhesives is well established in the plywood industry. Numerous formulations for such adhesives have been disclosed in the prior art, such as those described in the U.S. Pat. Nos. 2,150,693; 2,360,376; 2,437,981 and 2,457,493. These adhesives are generally applied as liquid resins. Phenolic adhesives are also well established in the waferboard industry, such as those described in U.S. Pat. Nos. 4,424,300 and 4,433,120. These adhesives are commonly applied as dry powders.

While such known adhesives are satisfactory for gluing dry veneers having moisture contents of 0% to 6%, they cannot be reliably employed with wet veneers having moisture contents as high as 10% or higher. With the latter, blisters develop on hot pressing, or even complete failure to form a bond under the usual conditions of temperature and pressing time which are employed in plywood manufacturing. In the case of waferboard, if the moisture content of the wafers is high, e.g. 10% or higher, excessive penetration of the adhesive into the wafers adversely affects bond quality.

Every plywood adhesive has a definable operating window with respect to the moisture available at the glue line. If insufficient moisture is present at the glue line, the adhesive is too dried out to flow adequately and form durable adhesive bonds. If too much moisture is present, excessive adhesive flow occurs leading to over-penetration of adhesive into the veneer and starved glue lines. When attempting to glue high moisture veneers, excessive flow and penetration must be overcome and further, a faster cure is required to overcome the inhibiting effect of the moisture on cure. In the present disclosure, resins have been formulated which show fast cure and good bond quality when high moisture veneers are incised and glued with the adhesive disclosed.

A primary object of the present invention is to provide an adhesive which can be employed successfully for gluing wet veneers or wafers having a higher moisture content than can be tolerated in present mill practice with commercial adhesives presently available. The higher moisture content is by way of example in the range of 10% to 20%.

A further object of the present invention is to provide a satisfactory adhesive for use both with dry and wet veneers and wood wafers to produce plywood, waferboard and composite board of quality equal to commercial specifications.

A further object of the present invention is to provide a phenol formaldehyde glue formulation that does not require a filler, requires a relatively short press time, and is capable of bonding veneers, wafers or pieces of wood without extensive adhesive loss from the glue line due to bleedthrough.

A further object is to provide a phenolic resin adhesive that is effective for hot press forming of plywood composite board and the like, with a relatively short cure time and which is effective on wet veneers.

A still further object of the present invention is to provide a composite board, waferboard, plywood panel or the like, bonded by an adhesive of the present invention.

A still further object of the present invention is to provide a composite board, plywood panel or the like, where the veneer or other starting material which has a relatively high impermeability to gas is improved by incising and where the veneers or other starting materials have a high moisture content.

A still further object of the present invention is to provide a plywood panel bonded by an adhesive of the present invention wherein the veneers having moisture contents higher than 8% are incised prior to hot press gluing.

SUMMARY OF THE INVENTION

The present invention relates to an improved phenol formaldehyde (PF) resin which comprises components A, B, and C, where component A is a conventional plywood PF adhesive, where component B is a partially cross-linked chemically modified PF resin in particulate form that swells in component A but is not soluble. Component C is a chemical capable of reacting with resins in component A and resins in component B. Enhanced results in some cases can be obtained by adding a fourth component, D, namely borax or a chromic acid salt, in an amount of, for example, 1% by weight of solid content of PF resin.

The adhesive mixture of the present invention is, for waferboard, preferably spray-dried and used as a powder. For plywood, it is preferably used as a liquid. While good results can be obtained when the adhesive is applied to nonincised veneers, much better results are obtained when the veneers are incised.

LIST OF DRAWINGS

FIG. 1 is a graph illustrating the relationship between PF solids and viscosity during partial cross-linking of component B;

FIG. 2 graphically illustrates gel time vs % propylene carbonate added based on total solution for component A (standard plywood resin) and for combination of components A and B;.

DETAILED DESCRIPTION

Component A of the adhesive is a PF resin produced by condensing phenol and formaldehyde in the presence of an alkali hydroxide catalyst in an amount expressed as equivalent to sodium hydroxide of not over 10% sodium hydroxide and preferably between 6% and 9.5% based on the total weight of the constituents of the highly advanced resin. The molar ratio of formaldehyde to phenol should range between 1.5: 1.0 and 2.5 : 1.0, preferably 1.8 : 1.0 to 2.2 : 1.0 and the resin composition should have a "stroke" cure at 250° F. of between 7 and 10 seconds and a resin solids content of about 40%.

Figure 1:
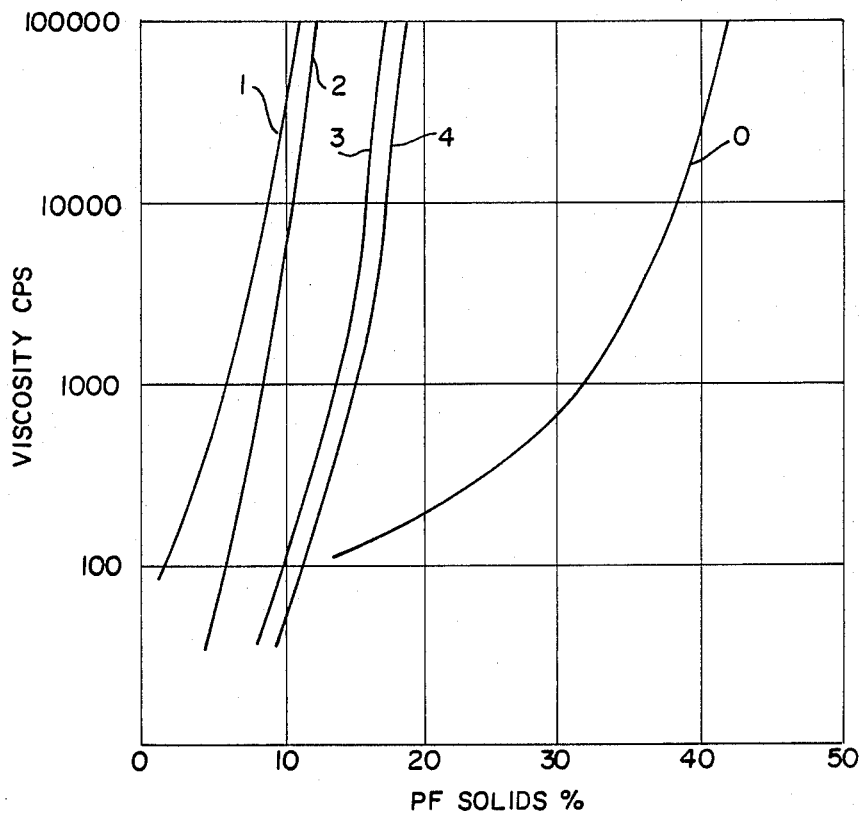

Component B is a partially cross-linked PF resin in particulate form made by cross-linking fine particle size resin produced by spray-drying, freeze-drying, or precipitating a highly advanced resin of the type described for component A. The cross-linking of the dispersed resin may take place during the formation of the particles or subsequent to their formation. The composition of the resin may be phenol and formaldehyde as described for component A or some of the phenol may be replaced during resin formation or during cross-linking with resorcinol or kraft lignin. The degree of partial crosslinking preferred is illustrated in FIG. 1. In this figure, viscosity is expressed in CPS at 6 RPM Brookfield Spindle No. 4. The relationship between PF solids and viscosity illustrated is the partial cross-linking of component B, the mixture being of PF powder in aqueous solution with 27% NaOH based on PF solids. In this Figure, a solution polymer of the type described in component A has a viscosity solids curve labelled "0". As it is cross-linked (component B) in the dispersed form the amount of solids to a given viscosity changes to the curve labelled "1". Further crosslinking results in a reduction in viscosity at a constant solids content as illustrated in curves 2, 3 and 4. The preferred degree of cross-linking would be represented by resins having viscosity curves in the range between the curves labelled "2" and "3". The preferred degree of cross-linking may be achieved by the use of heat and/or catalysis, e.g. acid, it may be achieved by the use of cross-linking agents such as alkylene carbonates, phenol resorcinol formaldehyde (PRF) resins, and diepoxy compounds. Cross-linking may take place during particle formation or subsequent to particle formation.

Components A and B can be prepared separately and mixed together. Depending upon the moisture content of the veneers or wafers, the ratio of components A to B can be varied. The preferred ratio for veneers having a moisture content of 10%–12% is 65 parts of A to 35 parts of B on a resin solids basis. The preferred range of ratios would be from 80/20 A/B to 50/50 A/B.

If the moisture content of the furnish is less than 10% moisture content, the ratio of A:B would require less than 35 parts of B. If moisture content is above 10% moisture content, the proportion of B would increase above 35 parts.

Figure 2:
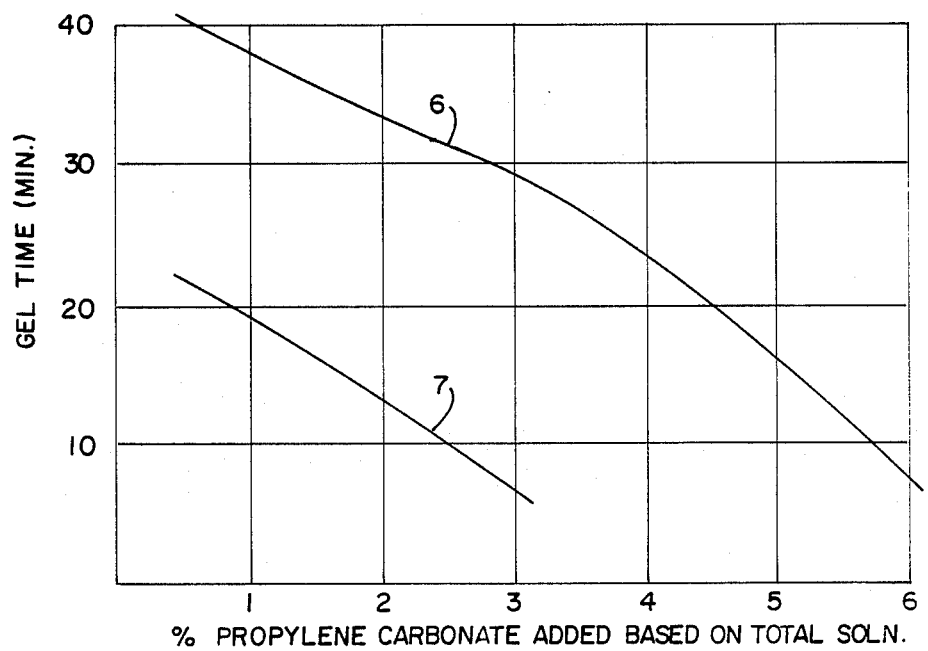

Component C is a chemical or resin capable of reacting with resins in components A and B. Cyclic carbonates and phenol-resorcinol-formaldehyde (PRF) resins have been found to be most effective. In FIG. 2 the effect of propylene carbonate on the gel times of component A (curve 6) or mixtures of components A and B (curve 7), are illustrated. Curve 7 is for an adhesive consisting of (a powder dispersion) 35% of component B and 65% of a standard plywood adhesive component. While gel times are not a reliable indicator of cure rates, component C plays a vital role in preventing migration of adhesive from the glue line during hot pressing under high moisture conditions.

Figure 3:
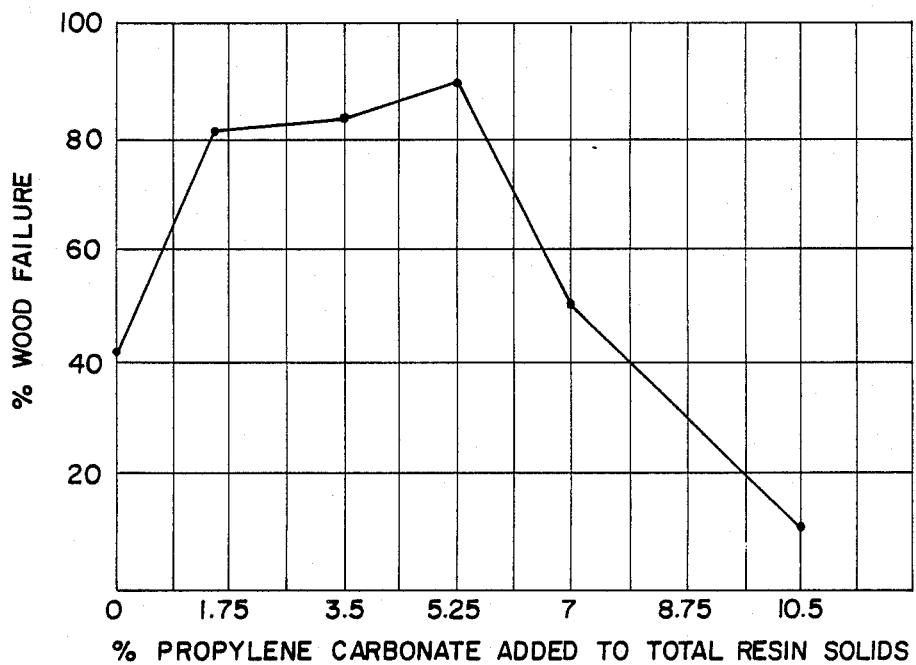
FIG. 3 is a graph illustrating % wood failure vs % propylene carbonate added to total resin solids.

In FIG. 3 the effect of propylene carbonate on bond quality is illustrated. Preferred ranges of component C can be seen to be in the range of 1%–5% of the resin solids of A and B combined. A most preferred range would be 1.5% to 3.5%

Figure 4:
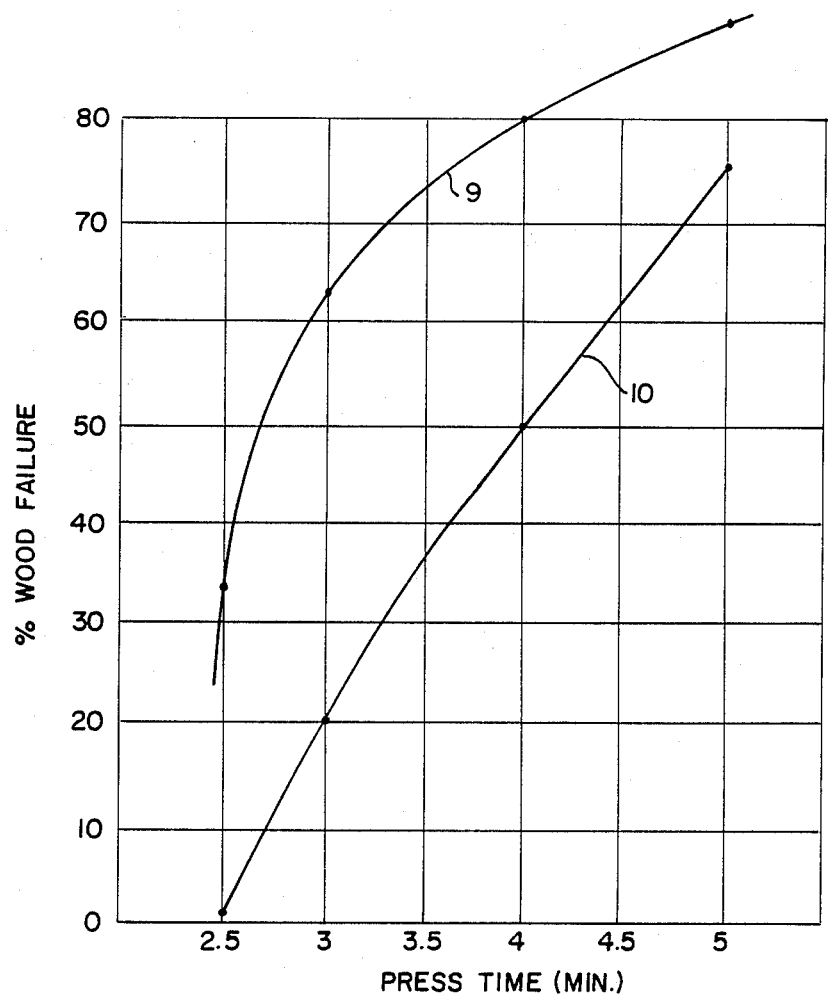
FIG. 4 is a graph illustrating press time for two adhesives vs % wood failure.

In FIG. 4 the relative cure rates of an adhesive as described in this application curve 9 are compared with a standard glue mix curve 10 containing fillers and extenders as currently used in plant practice. Curve 9 represents in particular an adhesive of the present invention and containing 3.5% propylene carbonate based on solid contents of components A and B. While the results illustrated in FIG. 4 are for a composition in which component C is propylene carbonate, similar results are obtained when propylene carbonate is replaced with small amounts (2%–10%) of resin solids of a PRF. Again, similar results are obtained when a mixture of propylene carbonate and PRF is used as component C.

The benefits of using compositions as described in this application with incised wet veneer, are illustrated in Table 1. It can be seen that while the disclosed composition cures faster than a standard glue mix with non-incised wet veneer, the cure rate of the composition is dramatically more rapid than that of the standard glue mix when incised wet veneer is used.

EXAMPLE 1

The adhesive system was composed of three components:

Component A (continuous phase)

To a reaction vessel with a high torque stirrer are added 495 g phenol (5 moles), 645 g of 46.5% formalin solution (10 moles), 580 g water and 100 g of a 50% aqueous NaOH solution. The mixture was heated to reflux temperature over about a 20-minute period and then maintained at about 95° C. until a viscosity of about 35,000 cp (at 25° C.) is attained. Following a short cooling period to bring the mixture to 75° C., a second 50% aqueous NaOH aliquot (140 g) is added and the reaction continued at about 80° C. until a viscosity of about 35,000 cps (at 25° C.) is attained. The third 50% aqueous NaOH (140g) is added and the reaction mixture held at 60° C. for 10 minutes then rapidly cooled to about room temperature. The resulting aqueous alkaline phenol formaldehyde (PF) resin is similar to a standard plywood resin and consisted of a solution of about 35% PF solids.

Component B (dispersed phase)

The dispersed phase is characterized as being a phenolic resin which is swellable but insoluble in strong aqueous caustic solution. This component is produced as follows:

A mixture of 4,000 grams of a plywood PF resin similar to Component A (45% overall solids consisting of 36% PF and 9% sodium hydroxide) and 4,000 grams of water are stirred rapidly at ambient temperature in a 10-liter container. Sulfuric acid, 12N, is slowly added to neutralize the highly alkaline mixture. As pH decreased below 12, the solution starts to thicken and froth due to the release of gases. Addition rate of acid is adjusted to maintain stirring action and to control frothing. Below about pH 10.5 the thick, syrup mixture begins to solidify and break up into particles. Maintaining the fast stirring action becomes easier as these particles form. Near neutral conditions, most of the polymeric mixture has precipitated but some frothing still occurs. Acid addition is terminated upon reaching solution pH of 3. The resulting mixture of dispersed particles is diluted with twofold the amounts of water and allowed to stand for 36 hours to allow for settling of the particles. The excess water is decanted to remove soluble inorganics and the remaining solution vacuum filtered to recover the phenolic precipitate. Drying at room temperature afforded a free-flowing powder.

The degree of partial cross-linking in the powder was characterized by determining viscosities of PF powder resin mixtures containing 5 to 25% PF solids and 27% NaOH (based on PF solids) in an aqueous solution. Viscosities were measured after the mixtures were allowed to stand for 5 hours at room temperature in order to achieve full wetting of the powder. The relationship between viscosity and PF solids in this example fell in between curves 2 and 3 of FIG. 1.

Component C (reactant)

The third formulation component was propylene carbonate which was added (3.5 g) to a slurry comprising 35 g of powder component B in 65 g of water. After standing for 3 hours at room temperature this mixture was dispersed in 200 g of component A to give a dispersion - resin formulation.

FORMULATION ASSESSMENT

The dispersion resin formulation (components A, B and C) and a standard commercial plywood glue mix (containing 23% PF solids, 8.1% bark filler, 3.8% wheat flour, 2.1% soda ash, 6% NaOH and 57% water) were used to prepare 4-ply parallel laminated strips (10 cm×30 cm) of spruce (0.3 cm thick veneer). Panels consisting of either all incised or all non-incised veneers were used. All veneers were conditioned to between 11% to 13% moisture content (m.c.) Glue spreads of 6.8 kg of PF solids per 100 m² double glueline were applied. Pressing conditions of 150° C. and 1.2 MPa pressure were used. For each press time, both adhesive mixtures were assessed on matched veneers in the same press load. Shear strength and wood failure results after vacuum-pressure-soak treatment of test specimens are given in Table 1.

Figure 5:
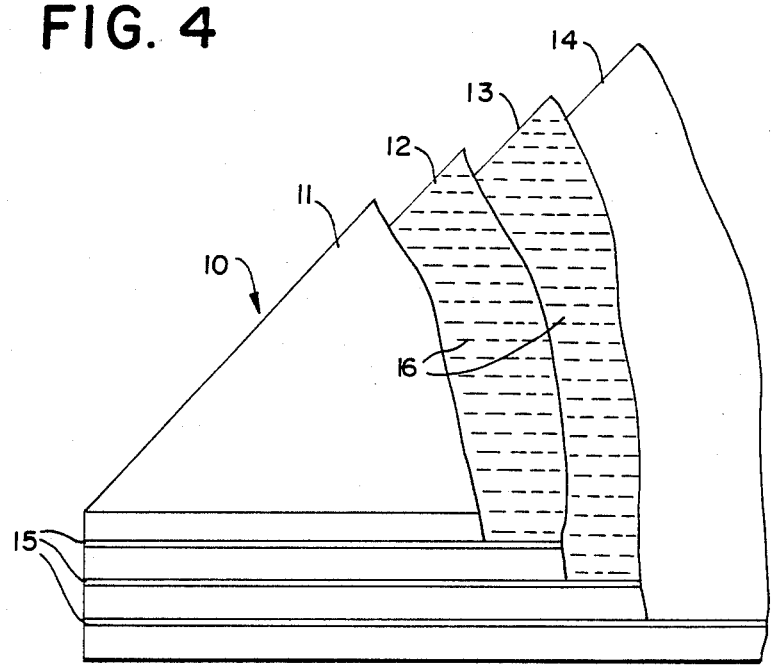
FIG. 5 is an oblique broken partial view of a plywood panel having the veneer layers bonded with an adhesive of the present invention.

Based on plywood standards requirements, wood failure is the prime indicator of bond quality with higher wood failure values corresponding to better bond quality. Wood failures above 80% indicate highly durable bonds. The adhesive of the present invention not only reduces press time but also provides superior plywood panels particularly when the veneers were incised prior to hot press gluing. FIG. 5, by way of example, depicts a portion of a plywood sheet, 10, consisting of four veneer layers designated 11, 12, 13 and 14 bonded together by adhesive layers 15. Inner layers 12 and 13 are shown as being incised and if desired the glue contact faces of veneers 11 and 14 may also be incised. Normally the outer faces of layers 11 and 14 would not be incised but in some instances they too could be incised.

TABLE 1

Bond Quality of Spruce (incised & non-incised)

| Press Time (min) | Control Glue Mix | | Dispersion - Resin Mix | |
|---|---|---|---|---|
| | psi | % wf | psi | % wf |
| Incised Spruce Veneer | | | | |
| 4 | 115 | 7 | 160 | 84 |
| 7 | 303 | 27 | 206 | 90 |
| 10 | 249 | 94 | 255 | 92 |
| Non-Incised Spruce Veneer | | | | |
| 4 | 51 | 3 | 177 | 24 |
| 7 | 191 | 10 | 226 | 28 |
| 10 | 197 | 67 | 152 | 82 |

EXAMPLE 2

The continuous phase component A was prepared as described in Example 1. Dispersion component B was manufactured by spray-drying resin A and then dispersing the alkaline powder (20 g) into low boiling petroleum ether (100 g) to form a slurry at room temperature. The powder was then modified chemically by adding, dropwise, propylene carbonate (2 g) to the stirred mixture over a 10-minute period. After allowing the petroleum ether to evaporate, the recovered dried powder was left at 10 room temperature for 24 hours. When mixed in aqueous caustic solution at different PF solids concentrations as described in Example 1, a viscosity-solids curve resulted which fell in between curves 2 and 3 of FIG. 1.

The resin dispersion formulation was produced by mixing 38.5 g of modified component B with 73 g of water and adding this slurry to 200 g of component A. Panels were prepared and tested using Douglas fir 0.3 cm thick, incised veneers in a manner similar to Example 1 with press times ranging from 2.5 to 5.0 minutes. The results are shown in Table 2.

TABLE 2

Bond Quality for Douglas Fir Veneer Strips (incised) at 10 +/− 2% moisture content (average of 20 samples)

| Press Times (min) | Standard Glue Mix | | Dispersion-Resin Mix | |
|---|---|---|---|---|
| | psi | % wf | psi | % wf |
| 2.5 | 31 | 2.3 | 195 | 32.4 |
| 3.0 | 177 | 22.0 | 254 | 64.0 |
| 4.0 | 274 | 48.0 | 260 | 81.0 |
| 5.0 | 302 | 74.5 | 252 | 89.6 |

EXAMPLE 3

A dispersion-resin mixture was prepared comprising 200 g of component A and 103.5 g of a slurry mixture consisting of component B (35), water (65g) and propylene carbonate (3.5 g) which had been standing at room temperature for 4 hours. In this case component B was prepared by precipitating a plywood resin like component A of Example 1, with glacial acetic acid, recovering the powder and heating it at 70° C. for 1.5 hours while tumbling in a drum, to give a material that satisfies the desired characteristics of partially cross-linked component B. This mixture, and another formulation consisting of a standard commercial plywood glue mix were used to bond 4-ply spruce veneer (incised) laminates (10+/−2% m.c.) as described in Example 1. Test results (FIG. 4) after vacuum pressure treatment of specimens indicated superior wood failure development in mixtures containing dispersion powders and propylene carbonate.

EXAMPLE 4

Component B was prepared as described in Example 3 and dispersed in water at 35% solids. To 100 g of this mixture a reactive "C" component consisting of 17 g of phenol-resorcinolformaldehyde (PRF) resin (50% PRF solids) and 0.4 g of paraformaldehyde was added during rapid stirring. One half of this mixture was removed and mixed with 2.1 g of propylene carbonate under high speed stirring. A third mixture was also prepared in a similar manner except that 6.8 g of PRF (50% solids) and 2.1 g of propylene carbonate were used as chemical modifiers. After 3 hours, 100 g of each mixture was combined with 200 g of PF plywood resin (component A of Example 1) and the resulting mixture used to bond 4-ply incised spruce veneer of 10+/2% m.c. This yielded glue mixtures with 8.5% and 3.5% PRF based on PF solids. Testing after vacuum-pressure-soak treatment gave the results shown in Table 3. These results illustrate how PRF can replace or be combined with propylene carbonate to act as the reactive component C.

TABLE 3

| | Bond Quality at Various Press Times | | | | | | | |
|---|---|---|---|---|---|---|---|---|
| Press time (mins) | Std. Glue Mix | | Dispersion 8.5% PRF | | Dispersion + 8.5% PRF + 3.5% PC | | Dispersion + 3.5% PRF + 3.5% PC | |
| | PSI | % WF | PSI | WF | PSI | % WF | PSI | % WF |
| 2.5 | — | delam | 233 | 56.1 | 146.3 | 40.8 | 192.7 | 16.4 |
| 3.0 | 126 | 10.5 | 197.6 | 76.8 | 195.0 | 61.3 | 225.8 | 71.1 |
| 4.0 | 170.4 | 23.8 | 239.0 | 88.8 | — | — | 242.7 | 94.6 |

Phenol resorcinol formaldehyde (PRF) and propylene carbonate (PC) added as a percentage of total PF solids.

EXAMPLE 5

Component B was prepared as described in Example 3 and dispersed in water at 35% solids. To 100 g of this mixture was added, under high speed stirring, 1.75 g of propylene carbonate. After 3 hours stirring, 100 g of this dispersion was mixed with 200 g of plywood resin. A fourth component consisting of either 0%, 1%, or 3% of borax (based on PF resin solids) was added to this mixture. Four-ply, incised spruce laminates at 10+/−2% moisture content was prepared and tested as described in Example 1. Results are given in Table 4. This example illustrates the effect of adding a fourth component, namely borax, which can help to thicken the glueline and improve bonding at lower press times.

TABLE 4

| | Bond Quality at Various Press Times | | | | | | | |
|---|---|---|---|---|---|---|---|---|
| Press time (mins) | Std. Glue Mix | | Dispersion + 0% Borax | | Dispersion + 1% Borax | | Dispersion + 3% Borax | |
| | PSI | % WF | PSI | WF | PSI | % WF | PSI | % WF |
| 2.5 | — | delam | 110 | 46.1 | 75.7 | 75.5 | 67.5 | 20.8 |
| 3.0 | 28.5 | 10.7 | 108.9 | 71.6 | 90.5 | 87.3 | 92.0 | 78.8 |
| 4.0 | 97.3 | 23.8 | 102.9 | 85.3 | 74.2 | 79.6 | 100.4 | 85.7 |

EXAMPLE 6

Component B, (350 g) prepared and dispersed in water (650 g) as a 35% solids slurry as described in Example 3, was mixed with propylene carbonate (35 g). This mixture was stored at room temperature in a closed container. Samples were removed at various storage times and mixed with PF plywood resin (component A of Example 1) in proportions of 35 parts slurry mixture to 65 parts plywood resin. Panel preparation and testing with incised spruce veneer at 10+/−2% m.c. followed procedures used in Example 1. The effect of stand time on bond quality is shown in Table 5.

TABLE 5

Effect of Stand Time after Addition of Propylene Carbonate (PC) Powder to Plywood Powder (each value an average of 20 specimens from 2 panels)

| | Standard Glue Mix Control | | Component B + 10% PC | |
|---|---|---|---|---|
| Stand Time | PSI | % WF | PSI | % WF |
| 0 min | 164.3 | 16.5 | 199.4 | 65.7 |
| 15 min | 132.2 | 13.7 | 226.7 | 65.0 |
| 30 min | 191.9 | 17.4 | 219.0 | 37.3 |
| 45 min | 190.0 | 17.7 | 223.6 | 67.0 |
| 60 min | 189.2 | 12.1 | 222.4 | 49.4 |
| 90 min | 225.5 | 11.7 | 192.5 | 61.4 |
| 120 min | 170.0 | 27.3 | 211.9 | 47.7 |
| 180 min | 157.7 | 15.2 | 224.4 | 75.0 |
| 4.5 hrs | 186.8 | 13.3 | 221.2 | 81.9 |
| 5.0 hrs | 196.8 | 39.1 | 162.7 | 96.8 |
| 24 hrs | 161.8 | 28.6 | 182.3 | 74.0 |
| 48 hrs | 202.5 | 35.8 | 203.2 | 89.9 |
| 72 hrs | 126.3 | 7.5 | 241.4 | 83.2 |
| 120 hrs | 153.8 | 11.5 | 191.6 | 68.9 |
| 240 hrs | 144.5 | 14.7 | 158.1 | 69.8 |

EXAMPLE 7

A spray dried PF plywood powder was placed in a fluidized bed column and 10% propylene carbonate by weight of PF solids was slowly sprayed onto the tumbling powder in the column. One hundred grams of this modified powder was blended with 200 g of spray dried powder. This mixture and a standard waferboard powder resin were used to bond model waferboard type systems comprised of incised spruce veneer strips assembled to 4-ply panels. The veneers were conditioned to either 40+/−5% m.c. or 15+/−2% m.c. Powder was applied at a spread of 7.5 kg per 100 m² of double glueline using a salt shaker-like applicator. Panels were pressed at 200° C. and 2.8 MPa and tested in the same manner as in Example 4. Bond quality is given in Table 6.

TABLE 6

| Resin | Waferboard Bond Quality at Various Press Times | | | | | | | |
|---|---|---|---|---|---|---|---|---|
| | Press Time | | | | | | | |
| | 4 (min) | | 5 (min) | | 6 (min) | | 7 (min) | |
| | PSI | % WF | PSI | % WF | PSI | % WF | PSI | % WF |
| | 16 +/− 2% mc wood | | | | | | | |
| Standard Waferboard Resin | 59.5 | 11.0 | 50.8 | 21.7 | 113.3 | 36.7 | — | |
| Modified Powder Resin | 97.1 | 25.8 | 95.8 | 82.1 | 131.4 | 63.2 | — | |
| | 40 +/− 5% mc wood | | | | | | | |
| Standard Waferboard Resin | delam | | delam | | delam | | 55.8 | 18.8 |
| Modified Powder Resin | 17.1 | 17.5 | 34.5 | 11.5 | 31.3 | 16.7 | 113.3 | 45.4 |

We claim:

1. An adhesive composition intended particularly for use in bonding veneers or wafers of wood having a moisture content greater than 8% said adhesive composition comprising:
    A. A highly advanced high molecular weight resin prepared by condensing phenol with an excess of formaldehyde in the presence of an alkaline hydroxide catalyst under reflux conditions;
    B. A resin powder or aqueous dispersion which is a phenol formaldehyde (PF) condensation product partially cross-linked so that the particles swell when added to component A without dissolving;
    C. A component selected from the group consisting of alkylene carbonates and phenol resorcinol formaldehyde (PRF) resins in an amount between about 1 and 10 weight percent based on the amount of solid resin in components A and B; and
    D. Optionally borax in the amount of 0 to 3 weight percent based on the amount of solid resin of components A and B.

2. The adhesive composition of claim 1 wherein component A has a molar ratio of formaldehyde to phenol ranging between about 1.8:1.0 to 2.2:1.0 and an alkalinity equivalent to the alkalinity produced by sodium hydroxide in an amount between 5 and 10 weight percent based on the amount of solid resin in components A and B, and a number average molecular weight from 800 to 5,000.

3. The adhesive composition of claim 1 in which component A is a phenol formaldehyde (PF) aqueous alkaline resin in which some of the phenol has been replaced by resorcinol.

4. The adhesive composition of claim 1 wherein the solids content is from 20% to 50% by weight.

5. The adhesive composition of claim 1 in which component B is produced from an alkaline PF resin having a number range molecular weight from 800 to 5,000.

6. The adhesive composition of claim 2 in which component B is produced from the alkaline PF resin described in component A.

7. The adhesive composition of claim 2 wherein component B is produced by precipitating the resin from alkaline solution using a strong acid and under conditions such that the resin is partially cured during the precipitation thereof; wherein the precipitated resin is characterized by having a viscosity of 1,000 or more centipoise based on a dispersion containing 10%–20% PF solids in 30% sodium hydroxide where the viscosity measurement is made at 6 revs per minute using a Brookfield spindle No. 4.

8. The adhesive composition of claim 2 wherein component B is produced by precipitating a mixture of the resin described as component A and methylolated kraft lignin under conditions such that the resin is partially cured during the precipitation.

9. The adhesive compositon of claim 2 wherein component B is produced by precipitating a mixture of the resin described as component A and a phenol-formaldehyde resorcinol (PFR) resin using a strong acid and under conditions such that the resin is partially cured during the precipitation.

10. The adhesive composition of claim 2 wherein component B is produced by spray-drying the resin described as component A with a chemical reactant or a resin capable of partially curing the resin during or subsequent to the spray-drying, which is selected from the group comprising cyclic carbonates, epoxy compounds and phenol resorcinol resins.

11. The adhesive composition of claim 2 wherein the ratio of component A to component B may range from 1:1 to 5:1.

12. The adhesive composition of claim 2 wherein component C is a cyclic alkylene carbonate or a PRF resin in an amount between 1 and 10 weight percent based on the solids of component A and B combined.

13. The adhesive composition of claim 2 wherein component C is a 50/50 mixture of propylene carbonate and a phenol resorcinol formaldehyde resin in an amount between 1 and 8 weight percent based on the solids of components A and B combined.

14. The adhesive composition of claim 2 wherein component C is propylene carbonate present in an amount between 1 and 4 weight percent based on the solids of components A and B combined.

* * * * *